Vladimir N. Mackiw
Sydney Nashner
Inventors

Attorney

Vladimir N. Mackiw
Sydney Nashner
Inventors

# United States Patent Office 2,693,405
Patented Nov. 2, 1954

2,693,405

METHOD OF SEPARATING COPPER VALUES FROM AN AMMONIACAL SOLUTION

Vladimir Nicolaus Mackiw, Ottawa, Ontario, Canada, and Sydney Nashner, Roslyn, N. Y., assignors to Sherritt Gordon Mines Limited, Toronto, Ontario, Canada, a corporation of Ontario Application June 20, 1952, Serial No. 294,642

6 Claims. (Cl. 23—135)

This invention relates to a process for the separation and recovery of metal values from ammoniacal solutions.

Hydrometallurgical methods involving the leaching of metaliferous materials such as ores and concentrates for the extraction of the metal values and subsequent treatment of the resulting leach solution for the recovery of the metal or metals of interest are relatively well known in the metallurgical art.

In general, the present invention is addressed to the precipitation of copper values contained in an ammoniacal solution. The method involves the steps of agitating and heating the solution which contains, in addition to copper values, at least one sulphur compound having a labile sulphur atom which is readily disassociated from the sulphur compound with which it is associated in the solution. The heating step is continued for a period of time sufficient for the disassociation of the labile sulphur atom from the sulphur compound. The labile sulphur atom, as it is released from the sulphur compound, combines with and converts copper values to copper sulphides which, being of relatively low solubility in the ammoniacal solution, precipitate from the solution as copper sulphides. The precipitated copper sulphides if in sufficient quantity preferably are separated from the solution and a relatively small amount of a metal sulphide having a higher solubility product than copper is added to the solution which is then heated and agitated for a period of time sufficient to convert the remainder of the copper values to and precipiate them from the solution as copper sulphides. The mixture of undissolved sulphur compound and precipitated copper sulphides is separated from the solution, such as by filtration, leaving the solution substantially free from copper values.

The process of the present invention possesses a number of important advantages. The capital and operating costs are low as compared with the capital and operating costs of conventional pyrometallurgical processes. The nickel, cobalt, copper and other metal values are recovered in a condition which permits of inexpensive treatment for the production of metals substantially free from impurities. Also, only a relatively small amount of metal values is locked in the process and by-products.

The boiling treatment is a very effective method of precipitating the major portion of the copper values as copper sulphides substantially free from contamination by other metal values and loss of other metal values, such as nickel and cobalt, is avoided. At the same time, the major portion of the free ammonia is released from the solution and can be recovered very easily in ideal condition for re-use. The boiling step can be conducted to effect the precipitation of substantially all the copper values as copper sulphides but this procedure has the disadvantages of increasing the time period of the operation and as the free ammonia content of the solution is reduced nickel and cobalt values tend to convert to and precipitate from the solution as nickel and cobalt sulphides with the copper sulphides.

The substantially complete separation of copper values from the solution is greatly facilitated and contamination of precipitated copper values with impurities and the loss of other metal values, such as nickel and cobalt values, is minimized by conducting the copper removal step in two stages, in the first of which the major portion of the copper values are precipitated without concurrent precipitation of other metal values such as nickel and cobalt values. The remainder of the copper values can then be precipitated as copper sulphides in a second stage. As the precipitate from this latter stage is returned to the leaching step, any co-precipitation of other metals does not involve loss of metal values.

The method of the present invention is independent of the source of the ammoniacal solution which contains the copper values and can be derived from any one of several hydrometallurgical methods for the extraction of metal values from ores and concentrates. For example, it has been found that metal values such as nickel, copper and cobalt contained in sulphide material, such as sulphide ores and concentrates and matte, can be successfully and economically extracted with a high degree of efficiency by leaching the sulphide material directly with a strong aqueous ammonia solution in the presence of an oxygen bearing, oxidizing gas, such as air, compressed air, oxygen enriched air, or oxygen alone or in combination with one or more inert gases, the leaching operation being conducted under a superatmospheric pressure of at least the vapour pressure of ammonia and water vapour at the prevailing operating temperaure. Under these conditions, nickel, copper and cobalt values of the starting material are rapidly and efficiently extracted from the starting material and are put into solution from which they can be separately recovered.

The present method is effective for obtaining a substantially complete separation of the copper values and other metal values present in the leach solution, which metal values have an avidity for sulphur and whose sulphides are of lower solubility in ammoniacal solution than cobalt sulphides, provided that sulphur is present in the solution in the form of a sulphur compound having a labile sulphur atom.

The term "sulphur compound having a labile sulphur atom" is intended to include those sulphur compounds having a labile sulphur atom in their structure which is readily disassociated at above atmospheric temperatures from the sulphur compound with which it is associated in the solution, and upon such disassociation or release is free to combine with metal ions, in solution, which have the lowest solubility product to form sulphides. Thiosulphate, polythionates having more than two sulphur atoms in their molecular structure such as trithionate and tetrathionate, and the like are illustrative of the sulphur compounds which can be employed with advantage in the operation of this process. Other sulphur compounds such as dithionate, sulphate, and sulphamate compounds, may be present in the solution but do not appear to take any part in the formation and precipitation of the copper sulphides.

Metal sulphides suitable for use in the method of the present invention are those which have a higher solubility product in ammoniacal solution than the solubility products of copper sulphides. Pentlandite, a nickel sulphide ore, and pyrrhotite, or cobalt, nickel and iron sulphides added to the solution or formed therein are illustrative of the substances which can be employed with advantage in the final stripping stage of the method of the present invention.

Sulphur compounds employed in the method can be produced in the leach solution during the leaching stage and the leaching operation can be conducted in a manner such that the final leach solution is rich in these sulphur compounds. Alternatively, the leach solution may be deficient in the desired sulphur compounds, in which case it would be necessary to add one or more such sulphur compounds to the solution, such as thiosulphate and/or trithionate, to prepare the solution for the boiling stage. Metal sulphide ores or concentrates are added to the stripping stage to produce in the leach solution the conditions necessary for the conversion of the remainder of the copper values to and precipitate them as copper sulphides.

It has been found that the leaching stage can be conducted conveniently in a manner such that the leach solution contains, in addition to the dissolved metal values, a sulphur compound of the group thiosulphate and polythionates having more than two sulphur atoms in their molecular structure in amount sufficient to effect the conversion of the bulk of the copper values to and precipitate them as copper sulphides by merely boiling the leach solution for a relatively short period of time.

It has been found also that any deficiency in the amount of the desired sulphur compound present in the leach solution at the end of the leaching stage can be supplemented by the addition of such compounds, preferably after the leach solution has been separated from the undissolved residue, such as by filtration, to produce the conditions necessary for the formation of and the precipitation of the copper values as copper sulphides. This modification of the process can be conducted very conveniently by adding a sulphur compound, such as, for example, thiosulphate and/or trithionate, to the boiling stage, and sulphide ores or concentrates or pyrrhotite to the stripping stage.

A further modification is to mix with the resultant ammoniacal solution sulphide concentrates and leach for an additional short period of time under superatmospheric pressure, an oxygen bearing, oxidizing gas being fed into the mixture during the course of this second leaching stage. The leach solution is then separated from the undissolved residue and boiled to release excess ammonia which can be recovered for re-use and to release sulphur atoms which combine with and convert a major portion of the copper values to and precipitates them as copper sulphides which can be separated from the copper free solution by filtration. The partially leached residue from this second leaching stage can be returned to the leaching circuit for the extraction of unextracted metal values.

A portion of the copper values are converted to and precipitated as copper sulphides during the boiling treatment. According to this invention, any copper values remaining in the solution after the boiling stage can be stripped from the solution in a subsequent stripping stage to produce a leach solution containing as low as 0.005 gram of copper per litre. This stripping stage can be conducted by adding to the solution from the boiling stage a metal sulphide, usually a relatively small amount, and agitating and heating the mixture for a period of time sufficient to convert remaining copper values to and precipitate them as copper sulphides. While any one or more of the metal sulphides can be employed in this step of the process, it is preferred to use a relatively small amount of the sulphide ores or concentrates employed in the leaching stage. The leach solution is recovered from this stripping step substantially free from copper and is in ideal condition for further treatment for the separation and recovery of metal values remaining in the solution.

An understanding of the method of the present invention can be obtained from the following description, reference being made to the accompanying drawings in which.

Figure 1:
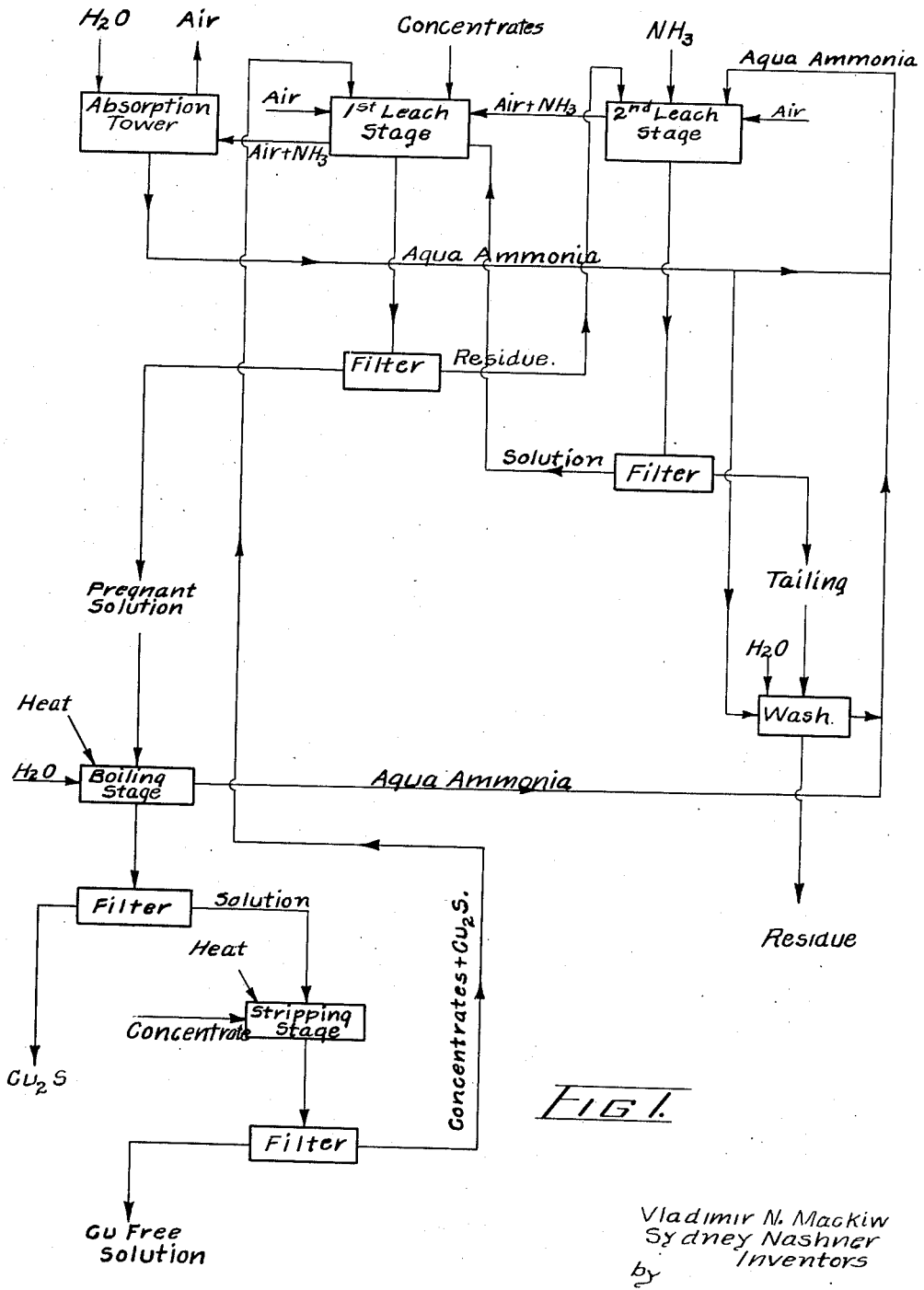
Figure 1 illustrates a flow sheet of a preferred embodiment of the invention.

An embodiment of the invention is illustrated in Figure 1, in which, a mineral sulphide flotation concentrate comprised of nickel sulphide, copper sulphide, cobalt sulphide and pyrrhotite, about 11% nickel, 2% copper and a small amount of cobalt, was charged into the first leaching stage wherein it was intimately mixed and actively agitated with a leach solution from the second leaching stage. An oxygen bearing, oxidizing gas and strong aqueous ammonia solution were fed into the reaction vessel during the leaching, which was conducted at a temperature within the range of from about 150° to about 190° F., preferably 160° to 180° F., and under a pressure of from about 80 to 100 pounds per square inch. A leach solution can be produced in this stage containing up to about 90 grams of nickel and about 20 grams of copper per litre. However, it is preferred to conduct the leaching operation to produce a solution containing from about 40 to about 50 grams of nickel and about 8 grams of copper per litre of solution to avoid crystallization of metal salts in the pipe lines.

This leach solution is separated from the undissolved residue, such as by filtration, and is in ideal condition for treatment by the process of the present invention for separation of the copper values as described in detail hereinafter.

The solid residue from the first leaching stage is passed to the second leaching stage wherein it is leached in the manner described above until the nickel, copper and cobalt values are substantially completely extracted from the starting material and put into solution. The leach solution from this stage is passed to the first leaching stage and the undissolved solid residue is washed and either discarded or passed to further treatment for the recovery of any remaining valuable constituents.

The ammonia employed in the leaching stage is strong aqueous ammonia and the dissolution of the nickel, cobalt and copper values in the solution is effected essentially by the reaction between these metal values in the sulphides, strong aqueous ammonia and the oxygen bearing oxidizing gas.

The pregnant leach solution from the first leaching stage, rich in desired sulphur compounds, is passed to the boiling stage wherein it is heated to and maintained at a temperature of from about 190° to 212° F. for a period of time sufficient for sulphur atoms to disassociate from the sulphur compounds and combine with copper values to convert the major portion of the copper values to copper sulphides which, being of relatively low solubility in the ammoniacal solution, precipitate from the solution. It has been found in the treatment of a leach solution as described above that the copper content of the solution can be reduced to from about 8 grams per litre to from about 0.5 to about 1.5 grams per litre in the boiling stage in about two hours.

The mixture from the boiling stage is filtered and the copper sulphide precipitate is passed to further treatment for the recovery of the copper values. The solution, which contains about 48 grams of nickel, about 1.2 grams of cobalt and from about 0.5 to 1.5 grams of copper per litre is passed to the stripping stage.

Sulphide concentrates are added to the solution passed to the stripping stage in amount sufficient to provide the sulphur compounds necessary to combine with and convert the remaining small amount of copper values to and precipitate them as copper sulphides. It is found that the addition of about 25 grams of concentrates for each gram of copper per litre of solution is sufficient to provide for the substantially complete precipitation of the remainder of the copper values as copper sulphides. This mixture of leach solution and concentrates is agitated and heated for a period of time sufficient to convert the small amount of copper remaining in the solution to and precipitate it as copper sulphide. It is found that the stripping operation can be completed in a relatively short period of time, of the order of about thirty minutes when it is conducted at a temperature of the order of from 190° to 212° F. at a partial pressure of oxygen of from about 5 to 10 pounds per square inch, the copper content being reduced to about 0.005 gram per litre. The mixture of leach solution and concentrates should not be exposed to the atmosphere any longer than necessary to avoid oxidation and re-dissolution of the copper in the solution.

The mixture from the stripping stage is filtered and the mixture of copper sulphide and concentrates is returned to the leaching stage and the copper free solution is passed to further treatment for the separation and recovery of the remaining metal values.

The leaching, boiling and stripping stages are ideally adapted for continuous operation. In the leaching stage, solution and concentrates can be passed in countercurrent through the respective stages, the time of retention and the operating conditions being controlled to produce a leach solution rich in desired sulphur compounds and containing the desired concentration of metal values with a maximum extraction of metal values from the starting material.

Figure 2:
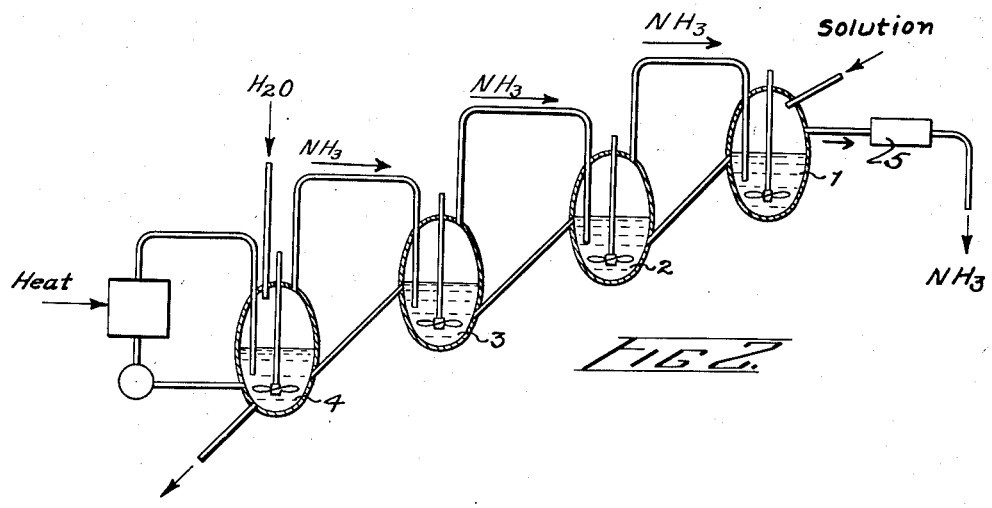
Figure 2 illustrates schematically a preferred embodiment of the boiling stage.

A preferred embodiment of the boiling stage is illustrated in Figure 2 wherein pregnant leach solution is fed into the first of a series of reaction vessels, such as autoclaves 1, 2, 3 and 4, and passed in sequence to and discharged from the final vessel. The solution in each vessel is maintained at or near its boiling temperature and is agitated actively. The time of retention of the solution in each vessel is controlled so that optimum conversion of copper values to and their precipitation as copper sulphides is effected in a minimum of time, and the copper content of the leach solution discharged from the final vessel is reduced to the extent that remaining copper values can be quickly and easily converted to and precipitated as copper sulphides in the stripping stage.

Water or steam can be admitted to the final reaction vessel in the series if necessary to maintain the desired concentration of other metal salts in the solution and ammonia gas and water vapour are passed in sequence from vessel to vessel in countercurrent to the flow of solution. The concentration of ammonia in the gas progressively increases as it passes through each vessel starting, for example, at about 20 grams ammonia per litre leaving vessel 4, 30 grams per litre leaving vessel 3, 60 grams per litre leaving vessel 2, and 100 grams per litre leaving vessel 1. This final effluent gas is passed through a condensor 5 and produces a condensate containing about 150 grams of ammonia per litre and is in ideal condition for returning to the leaching stage.

Sulphide concentrates in the amount of about 25 grams for each gram of copper per litre of solution is added to the solution from the boiling step and the mixture is passed to the stripping stage.

Figure 3:
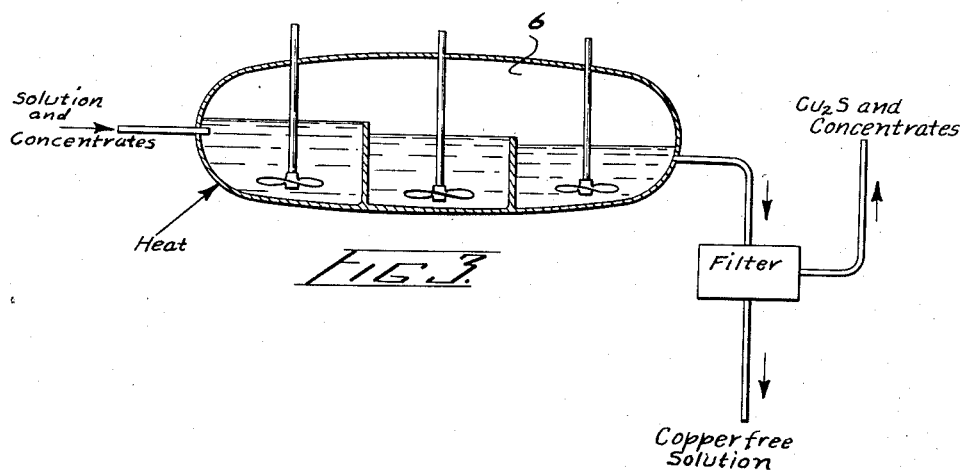
Figure 3 illustrates schematically a preferred embodiment of the stripping stage.

A preferred embodiment of the stripping stage is illustrated by Figure 3. The mixture of solution and concentrates is charged into one end of a horizontally disposed autoclave which is divided by vertical baffles into a series of compartments. The mixture is maintained at a temperature of from about 190° F. to about 212° F. and is thoroughly agitated as it advances through the series of compartments towards and to the discharge outlet at the end opposite to the feed end. The rate of the advancement of the mixture is controlled so that subsantially all the copper values remaining in the solution are converted to and precipitate as copper sulphides, the copper content of the solution discharged from the stripping stage being reduced to as low as 0.005 grams per litre or lower. This solution is filtered to separate the undissolved concentrates and precipitated copper sulphides from the copper-free leach solution. The solids are passed to the leaching stage and the solution, substantially free from copper, is passed to further treatment for the separation and recovery of the remaining metal values.

While the invention is independent of hypothetical considerations, it appears that as the free ammonia content of the pregnant leach solution is reduced during boiling, copper ions react with disassociated labile sulphur atoms to form copper sulphides which, being of low solubility in the ammoniacal solution, precipitate: The following equations illustrate the mechanics of the reactions which appear to take place:

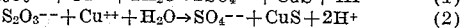
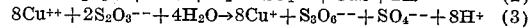
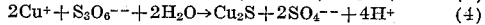

$$S_3O_6^{--} + Cu^{++} + 2H_2O \rightarrow 2SO_4^{--} + CuS + 4H^+ \quad (1)$$
$$S_2O_3^{--} + Cu^{++} + H_2O \rightarrow SO_4^{--} + CuS + 2H^+ \quad (2)$$
$$8Cu^{++} + 2S_2O_3^{--} + 4H_2O \rightarrow 8Cu^+ + S_3O_6^{--} + SO_4^{--} + 8H^+ \quad (3)$$
$$2Cu^+ + S_3O_6^{--} + 2H_2O \rightarrow Cu_2S + 2SO_4^{--} + 4H^+ \quad (4)$$

During the boiling step, the free ammonia content of the leach solution is reduced by evaporation and is returned to the leaching stage of the process. Water is added during the boiling step to maintain the nickel content of the solution safely below that at which there would be crystallization of nickel salts from the solution, for example, below about 50 grams of nickel per litre.

Precipitation of copper sulphide appears to commence when the free ammonia is reduced to about 60 grams per litre and is practically complete when the free ammonia approaches 30 grams per litre. If the mol ratio of free ammonia to nickel plus cobalt is reduced to less than about 2:1 there is danger of the precipitation of basic nickel and cobalt salts.

It will be understood, of course, that modifications can be made in the preferred embodiments of the invention described and illustrated herein without departing from the scope of the invention as defined by the appended claims.

What we desire to protect by Letters Patent of the United States is:

1. The method of separating copper values from an ammoniacal solution containing in solution copper values, at least one sulphur compound of the group thiosulphate, trithionate and tetrathionate, values of at least one of the metals nickel and cobalt and free ammonia in excess of about 60 grams per litre, which comprises the steps of actively agitating the solution at a temperature above about 190° F. for a period of time sufficient to convert the major portion of the dissolved copper values to and precipitate them as copper sulphides substantially free of nickel or cobalt values, separating precipitated copper sulphides from the ammoniacal solution, adding to the solution a metal sulphide having a higher solubility product in ammoniacal solution than the solubility products of copper sulphides and agitating the solution at a temperature above about 190° F. in the presence of an oxygen bearing, oxidizing gas, to convert substantially the remainder of the dissolved copper values to and precipitate them as copper sulphides, and separating substantially copper-free ammoniacal solution from the undissolved solids.

2. The method of separating copper values from an ammoniacal solution containing in solution copper values, at least one sulphur compound of the group consisting of thiosulphate, trithionate and tetrathionate, values of at least one of the metals nickel and cobalt, and free ammonia in excess of about 60 grams per litre, which comprises the steps of agitating the solution at a temperature above about 190° F. for a period of time sufficient to convert the major portion of the dissolved copper values to and precipitate them as copper sulphides substantially free from nickel or cobalt values, separating precipitated copper sulphides from the ammoniacal solution, replenishing the solution with ions of a sulphur compound of the group consisting of thiosulphate, trithionate and tetrathionate, agitating the solution at a temperature above about 190° F. for a period of time sufficient to convert substantially the remainder of the dissolved copper values to and precipitate them as copper sulphides, and separating the resultant copper-free solution from the solid residue.

3. The method of removing copper values from an ammoniacal solution containing in solution copper values, at least one sulphur compound of the group thiosulphate, trithionate and tetrathionate, values of at least one of the metals nickel and cobalt, and free ammonia in excess of about 60 grams per litre, which comprises the steps of agitating the solution at a temperature above about 190° F. for a period of time sufficient to convert the major portion of the dissolved copper values to and precipitate them as copper sulphides substantially free from nickel or cobalt values, separating precipitated copper sulphides from the solution, agitating the residual solution at a temperature above about 190° F. in the presence of an oxygen bearing, oxidizing gas with a metal sulphide having a higher solubility product in ammoniacal solution than the solubility products of copper sulphides in amount sufficient to convert substantially the remainder of the dissolved copper values to and precipitate them as copper sulphides, separating the resultant substantially copper-free solution from the percipitated solids, and re-cycling solids separated from the copper-free solution in the last-mentioned step to obtain copper containing solution to be treated in a subsequent cycle.

4. The method of separating and recovering copper values from sulphide material containing copper values and values of at least one of the metals nickel and cobalt which comprises the steps of leaching the sulphide material with strong aqueous ammonia at elevated temperature and under superatmospheric pressure in the presence of an oxygen bearing, oxidizing gas to form a leach solution containing, in solution, copper values, values of at least one of the metals nickel and cobalt, a sulphur compound of the group thiosulphate, trithionate and tetrathionate, and free ammonia in excess of about 60 grams per litre, separating leach solution from the undissolved residue, agitating the leach solution at a temperature above about 190° F. for a period of time sufficient to convert the major portion of the dissolved copper values to and precipitate them as copper sulphides substantially free from nickel or cobalt values, separating precipitated copper sulphides from the leach solution, adding a metal sulphide having a higher solubility product in ammoniacal solution than the solubility products of copper sulphides to the solution and agitating the mixture at a temperature above about 190° F. in the presence of an oxygen bearing, oxidizing gas for a period of time sufficient to convert substantially the remainder of the copper values to and precipitate them as copper sulphides, and separating the substantially copper-free solution from the solid residue.

5. The method of separating and recovering copper values from sulphide material containing copper values and values of at least one of the metals nickel and cobalt which comprises the steps of leaching the sulphide material with strong aqueous ammonia at elevated temperature and under superatmospheric pressure in the presence of an oxygen bearing, oxidizing gas to form a leach solution containing, in addition to dissolved metal values, a sulphur compound of the group thiosulphate, trithionate and tetrathionate, and free ammonia in excess of about 60 grams per litre, separating undissolved residue from leach solution, agitating the ammoniacal leach solution at a temperature above about 190° F. for a period of time sufficient to convert the major portion of the dissolved copper values to and precipitate them as copper sulphides, collecting precipitated copper sulphides as copper product substantially free from nickel or cobalt values, adding a metal sulphide having a higher solubility product in ammoniacal solution than the solubility products of copper sulphides to the solution and agitating the solution at a temperature above about 190° F. in the presence of an oxygen bearing, oxidizing gas to convert substantially the remainder of the copper values to and precipitate them as copper sulphides, separating the final substantially copper-free solution from the undissolved solids, and returning undissolved solids from the final copper sulphide precipitating step to the first mentioned leaching step of the method.

6. The method of separating copper values from an ammoniacal solution containing free ammonia in excess of about 60 grams per litre, copper values, at least one sulphur compound selected from the group consisting of thiosulphate, trithionate and tetrathionate and values of at least one of the metals nickel and cobalt which comprises the steps of passing the solution in sequence through a plurality of reaction vessels, agitating the solution in each vessel at a temperature above about 190° F. for a period of time sufficient to convert dissolved copper values to and precipitate them as copper sulphides without substantial precipitation of nickel or cobalt values, passing released ammonia in sequence through the reaction vessels in countercurrent to the flow of solution, recovering ammonia released from the first reaction vessel of the series, replenishing the solution from the final reaction vessel of the series with ions of a sulphur compound selected from the group consisting of thiosulphate, trithionate and tetrathionate, agitating the solution at a temperature above about 190° F. for a period of time sufficient to convert substantially the remainder of the copper values to and precipitate them as copper sulphides, and separating precipitated solids from the copper-free solution.

References Cited in the file of this patent

UNITED STATES PATENTS

| Number | Name | Date |
| --- | --- | --- |
| 2,576,314 | Forward | Nov. 27, 1951 |